United States Patent [19]

Jervis

[11] Patent Number: 4,477,479
[45] Date of Patent: Oct. 16, 1984

[54] LIQUID DOUGH CONDITIONERS AND DOUGH PRODUCT CONTAINING SAME

[75] Inventor: Daniel A. Jervis, Kingsport, Tenn.

[73] Assignee: Eastman Kodak Company, Rochester, N.Y.

[21] Appl. No.: 528,751

[22] Filed: Sep. 1, 1983

[51] Int. Cl.³ .......................... A21D 2/14; A23D 5/00
[52] U.S. Cl. .................................. 426/549; 426/612; 426/653; 426/654; 426/19
[58] Field of Search ............... 426/653, 549, 19, 602, 426/612, 654, 606

[56] References Cited

U.S. PATENT DOCUMENTS

| | | | |
|---|---|---|---|
| T100,503 | 4/1981 | Taylor | 426/653 |
| 3,180,736 | 4/1965 | Landfried | 426/653 |
| 3,623,888 | 11/1971 | Reid | 426/601 |
| 4,137,338 | 1/1979 | Gawrilow | 426/612 |

Primary Examiner—Raymond Jones
Assistant Examiner—Elizabeth A. King
Attorney, Agent, or Firm—John F. Stevens; Daniel B. Reece, III

[57] ABSTRACT

Liquid dough conditioners for bakery goods are disclosed which comprise a blend of diacetyl tartaric acid esters of glycerides, glycerides, and either lactic acid or an acyl lactylic acid. These conditioners are stable in varying temperature conditions.

6 Claims, No Drawings

LIQUID DOUGH CONDITIONERS AND DOUGH PRODUCT CONTAINING SAME

TECHNICAL FIELD

This invention relates to stabilized liquid dough conditioners which are useful in the baking industry, particularly for bread. The conditioners comprise a blend of diacetyl tartaric acid esters of glycerides, [DTAEG], glycerides and lactic acid or an acyl lactylic acid.

BACKGROUND OF THE INVENTION

Dough conditioners function to improve bread volume, to impart dough strength, to retard bread crumb staling, to improve bread texture, and to improve dough machinability. They may also allow use of lower levels of shortening and higher water absorption in the dough.

Liquid dough conditioners are advantageous in comparison with hydrates and plastics because they are less expensive to ship, occupy less warehouse space, and may be metered into dough mixing operations.

Diacetyl tartaric acid esters of glycerides may be prepared as a liquid and when blended with other glycerides, provide a dough conditioner which may be economically and technically feasible to use. Such a dough conditioner will have to withstand adverse shipping conditions (freezing and thawing) without phase separation. This invention is based on the discovery that lactic acid and certain acyl lactylic acid act as clarifying agents in liquid DTAEG/glyceride dough conditioner blends. An objective of this invention is to develop an effective liquid dough conditioner which remains homogeneous and clear upon warming to room temperature after chilling or freezing. Diacetyl tartaric acid esters of glycerides, glycerides, lactic acid and acyl lactylic acid are all known additives for dough products. For example, see U.S. Pat. Nos. 3,244,534; 2,733,252; 3,494,771; 3,146,110; 2,236,517; 2,520,139; 3,592,660; and 3,773,521.

DISCLOSURE OF THE INVENTION

According to the present invention, a liquid dough conditioner, or strengthener, is provided which is useful in the baking industry especially for bread. The conditioner is a tri-component blend of diacetyl tartaric acid ester of glycerides, glycerides and lactic acid or an acyl lactylic acid wherein the acyl radical is of a fatty acid having 14-22 carbon atoms. Preferably, the fatty acid is stearic or palmitic. More specifically, the present invention provides a dough conditioner which is liquid at room temperature comprising about 10 to about 90 weight % of diacetyl tartaric acid esters of glycerides, about 6 to about 86 weight % of glycerides, and about 4 to about 12 weight % of a compound selected from lactic acid and an acyl lactylic acid wherein the acyl radical is of a fatty acid having 14-22 carbon atoms.

Glycerides are well known in the art and many are commercially available. For example, a suitable commercially available glyceride is Myverol 18-92 distilled monoglyceride, a product of Eastman Chemical Products, Inc. The glycerides are prepared from glycerol and fatty acids having 8-22 carbon atoms such as are found in vegetable oils and animal fats. Preferably, the iodine value is about 70 to about 140.

Procedures for the preparation of distilled, high purity monoglyceride products are disclosed in U.S. Pat. Nos. 2,634,234; 2,634,278 and 2,634,279.

Diacetyl tartaric acid esters of glycerides are well known in the art. For example, see U.S. Pat. No. 2,236,516. Certain of these esters are in widespread commercial use. They are prepared, as described in this patent, by reaction, for instance, of a higher fatty acid glyceride with diacetyl tartaric acid anhydride or acetyl citric acid anhydride. Preferably, the iodine value is about 113 to 123. Diacetyl tartaric acid esters of glycerides are available commercially, for example, as Myvatem dispersing agent, marketed by Eastman Chemical Products, Inc.

The term "glycerides" as used herein is intended to include compositions having a major portion of monoglycerides, preferably at least 60% by weight and most preferably about 90% by weight. Also, the glyceride compositions may include some diglyceride, preferably no more than about 40% by weight and most preferably no more than about 10% by weight. The glyceride compositions may also include some triglycerides, preferably no more than about 10% by weight.

Glycerides are usually prepared by conventional methods of glycerolysis of edible fats and oils; that is, by reacting glycerine with a fatty acid, glyceride, or other fatty acid ester or by directly esterifying glycerine with a fatty acid having from about 8 to about 22 carbon atoms. Typical of such glycerides are glyceryl monooleate, glyceryl monostearate, and glyceryl monopalmitate.

Lactic acid, $CH_3CHOHCOOH$, is a well known acid which is commercially available.

The acyl lactylic acid consists essentially of an acyl lactylic acid. This is a compound which is formed by condensing lactic acid under self-esterification conditions and the resulting condensate is reacted with a $C_{14}$ to $C_{22}$ acyl chloride. The condensation of lactic acid under one set of self esterification conditions is disclosed in U.S. Pat. No. 2,789,992. The condensation of lactic acid under another set of self esterification conditions is described in the U.S. Pat. No. 3,141,030. The acyl lactylic acid of this invention encompasses the acyl lactylic acid products of both these patents. These products are mixtures which are represented by the generic formulas disclosed in those patents. With those formulas in mind the acyl lactylic acid of this invention is represented by the formula:

wherein RCO is a member selected from the group consisting of acyl radicals of fatty acids containing 14-22 carbon atoms, and mixtures thereof, and n is a number representing the average number of lactyl $(OCHCH_3CO)$ groups present per molecule of the composition, the value of n being in a range from about 0.3 to about 9. Examples of acyl lactylic acid materials include stearoyl lactylic acid products wherein n is 2-4.

The liquid dough conditioner is prepared by placing diacetyl tartaric acid esters of glycerides and glycerides in a beaker and heating them to 125°-130° F. using a steam bath and moderate agitation (mechanical stirrer). Then, the lactic acid or actyl lactylic acid is added and stirring is continued until a homogeneous blend is obtained. Next, the blend is removed from the steam bath and allowed to cool to room temperature.

The lactic acid or acyl lactylic acid in the liquid dough conditioner blends promotes the clearing of previously chilled or frozen blends as they warm to room temperature. After freezing or chilling, the cloudiness which remains in the DTAEG ester/glyceride blends or even in the DTAEG ester alone is probably due to the presence of higher melting glycerides which may be stearic acid esters or "stearines." The addi-tion of the appropriate amount of lactic acid to these blends or to the liquid DTAEG ester alone apparently solubilizes the glycerides. The DTAEG ester portion of the blend acts as a dough strengthener, providing higher bread volumes and resistance to dough shock. Dough strength is attained by the interaction of the DTAEG ester with the flour proteins which increases gluten crosslinking. The glyceride fraction of the blend provides bread crumb softening.

The liquid dough conditioners are effective in all yeast raised bakery products and may be useful in some chemically leavened products as well.

In the examples, bread softness data are obtained with a penetrometer, available from GCA/Precision Scientific of Chicago, Ill. Five measurements are taken from one pound loaves of bread using three slices per measurement. A 102.5 gram grease cone probe is dropped into the bread and its penetration is measured in 1/10 millimeter divisions. The softness value is the arithmetical average of the measurements taken from four loaves at the end of three days' storage. A higher mean softness value indicates softer bread and a lower value indicates firmer bread.

Bread volume for each test batch is determined by conventional methods using a rapeseed displacement technique. Volume determinations are made immediately after baking. Bread volumes from both shocked and unshocked doughs are statistical means of four loaves. Shocked doughs are dropped 6 inches against a solid surface just before baking. Bread is packaged in 1-mil. polyethylene bags and stored at 25° C.

The conditioner produced as described above is found to be especially useful in the production of bread. The conditioner may be added to either the "sponge" or the "dough" of the sponge dough process and to the "brew", shortening or nutrient system of the continuous mix process. The conditioner is preferably added in amounts of between about 85 g and about 340 g per 45.36 kg. of flour.

TYPICAL BREAD FORMULA - (SPONGE-DOUGH PROCESS)

| | Percent of Flour |
|---|---|
| Sponge: | |
| Flour | 65.0 |
| Water | 42.0 |
| Yeast | 2.0 |
| Yeast food | 0.5 |
| Mix time: 4.5 minutes. | |
| Ferment time: 4.5 hours at 31° C. and 88% humidity. | |
| Dough (includes the fermented sponge): | |
| Flour | 35.0 |
| Water | 27.0 |
| Sugar | 6.0 |
| Salt | 2.3 |
| Milk powder | 4.0 |
| Shortening | 3.0 |
| Dough conditioner, test level | |
| Mix time: 9.5 minutes. | |
| Floor time: 30 minutes. | |
| Proof time: 1 hour at 42° C. and 88% humidity. | |
| Bake time: 20 minutes at 232° C. | |

Examples illustrating the invention are given in Tables I and II. Table I contains freeze-thaw stability data and Table II contains results of bake test data. Freeze-thaw stability tests indicate that about eight percent of lactic acid or acyl lactylic acid is needed to assure room temperature clearing of the DTAEG/glyceride/lactic acid blends. The same level is also effective in improving freeze-thaw stability when added to DTAEG alone. The DTAEG alone passes four freeze-thaw cycles but forms a precipitate after aging three weeks after freezing. The DTAEG/glyceride blend less the lactic acid passes only one cycle and also forms a precipitate after freezing and three weeks of aging. Lower levels of lactic acid (two and four percent) in DTAEG/glyceride/lactic acid blends do not produce room temperature clearing but are effective in that no precipitate forms as in the case of DTAEG and the DTAEG/monodioleate blend. Some DTAEG/glyceride/triglyceride/lactic acid blends also show no signs of precipitation and remain homogeneous although failing to clear after two freeze-thaw cycles. A similar blend (Table I, Example 11) containing no lactic acid fails to pass a single freeze-thaw cycle.

Results of bake tests (Table II) indicate that blends containing DTAEG/glyceride/lactic acid are effective liquid dough conditioners. This effectiveness is evidenced by dough strengthening properties (high volumes from both shocked and unshocked doughs) which are superior to controls used as standards on current control charts. The liquid dough conditioners are also effective bread crumb softeners as evidenced in comparison with negative control bread.

The DTAEG used in the blend is prepared using a distilled monoglyceride having a minimum monoester content of 90%, an iodine value of 118±5, an acid value of 3.0 (max.), and a melting point of 41° C. The monodioleate used in the blend contains 61–66% monoglyceride, has an iodine value of 74–78, and is a light amber clear liquid. The lactic acid used in the blend is 86–88% lactic acid. Blends containing actyl lactylic acid rather than lactic acid give similar results.

TABLE I

FREEZE-THAW STABILITY OF LIQUID DOUGH CONDITIONERS

| Example | 1 | 2 | 3 | 4 | 5* | 6 | 7 | 8 | 9 | 10 | 11* | 12 |
|---|---|---|---|---|---|---|---|---|---|---|---|---|
| Composition | | | | | | | | | | | | |
| DTAEG | 60 | 60 | 60 | 60 | 100 | 92 | 60 | 60 | 20 | 40 | 40 | 60 |
| Monoglyceride | — | — | — | — | — | — | — | — | 10 | 10 | 10 | — |
| Monodioleate | 40 | 38 | 36 | 32 | — | — | 38 | 38 | — | — | — | 35 |
| Triglyceride | — | — | — | — | — | — | — | — | 61.6 | 41.6 | 50 | — |
| Lactic Acid | — | 2 | 4 | 8 | — | 8 | — | — | 8.4 | 8.4 | — | — |
| Stearoyl Lactylic Acid | — | — | — | — | — | — | — | — | — | — | — | 5 |
| Freeze-Thaw Cycle | | | | | | | | | | | | |
| 1st Clear Point (°C.) | 10 | 10 | 10 | 9 | 16 | 14 | 10 | 10 | 10 | 10 | >23 | <16 |
| 2nd Clear Point (°C.) | 34 | 33 | 27 | ~23 | 16 | 14 | 31 | 32 | 11 | 13 | — | <16 |

TABLE I-continued

| FREEZE-THAW STABILITY OF LIQUID DOUGH CONDITIONERS | | | | | | | | | | | | |
|---|---|---|---|---|---|---|---|---|---|---|---|---|
| Example | 1 | 2 | 3 | 4 | 5* | 6 | 7 | 8 | 9 | 10 | 11* | 12 |
| 3rd Clear Point (°C.) | — | — | — | 11 | 16 | 14 | — | — | — | — | — | <16 |
| 4th Clear Point (°C.) | — | — | — | 21 | 17 | 15 | — | — | — | — | — | <16 |
| 5th Clear Point (°C.) | — | — | — | 21 | — | ~23 | — | — | — | — | — | 25 |

**Samples become hazy and formed a precipitate after aging for three weeks. All other samples remain clear and homogeneous.

TABLE II

| BAKE TEST DATA FOR LIQUID DOUGH CONDITIONERS | | | | | | |
|---|---|---|---|---|---|---|
| Examples | 1 | 2 | 3 | 4* | 5** | 6 |
| Composition | | | | | | |
| DTAEG | 60 | 40 | 20 | — | — | 60 |
| Monoglyceride | — | 10 | 10 | — | — | — |
| Monodioleate | 32 | — | — | — | — | 35 |
| Triglyceride | — | 41.6 | 61.6 | — | — | — |
| Lactic Acid | 8 | 8.4 | 8.4 | — | — | — |
| Stearoyl Lactic Acid | — | — | — | — | — | 5 |
| Usage Level (oz./cwt.) | 2.5 | 3.75 | 3.75 | 0 | 3.75 | 1.25 |
| Shocked Volume (mL) | 2225 | 2250 | 2156 | 2117 | 2129 | 2219 |
| Unshocked Volume (mL) | 2469 | 2463 | 2467 | 2313 | 2350 | 2488 |
| Softness (3rd day) | 308 | 319 | 307 | 289 | 325 | 325 |

*Control bread containing no dough conditioner.
**Current control chart values for volumes and softness (3rd day) determined using commercial dough strengtheners and crumb softeners at 6 oz./cwt. of flour.

The iodine values specified herein are measured in accordance with AOCS Official Method Cd 1-25 (rev. April, 1956), Official and Tentative Methods of the American Oil Chemists Society, 2nd ed., additions and revisions 1947 through 1963, inclusive.

Unless otherwise specified, all percentages, ratios, parts, etc., are by weight.

The invention has been described in detail with particular reference to certain preferred embodiments thereof, but it will be understood that variations and modifications can be effected within the spirit and scope of the invention.

I claim:

1. A dough conditioner which is liquid at room temperature comprising about 10 to about 90 weight % of diacetyl tartaric acid esters of glycerides, about 6 to about 86 weight % of glycerides, and about 4 to about 12 weight % of a compound selected from lactic acid and an acyl lactylic acid, wherein the acyl radical is a fatty acid having 14-22 carbon atoms.

2. A dough conditioner which is liquid at room temperature comprising about 10 to about 90 weight % of diacetyl tartaric acid esters of monoglycerides, about 6 to about 86 weight % of glycerides, and about 4 to about 12 weight % lactic acid.

3. A dough conditioner which is liquid at room temperature comprising about 10 to about 90 weight % of diacetyl tartaric acid esters of monoglycerides, about 6 to about 86 weight % of glycerides, and about 4 to about 12 weight % of an acyl lactylic acid wherein the acyl radical is a fatty acid having 14-22 carbon atoms.

4. A dough conditioner according to claim 1 wherein said glycerides comprise at least 60 weight % monoglycerides.

5. A dough conditioner according to claim 1 wherein said glycerides comprise at least 90 weight % monoglycerides.

6. A dough product comprising from about 85 to about 340 grams per 45 Kg of flour of the conditioner according to claim 1.

* * * * *